United States Patent [19]

Blankenship

[11] Patent Number: 5,278,390
[45] Date of Patent: Jan. 11, 1994

[54] SYSTEM AND METHOD FOR CONTROLLING A WELDING PROCESS FOR AN ARC WELDER

[75] Inventor: George D. Blankenship, Chardon, Ohio

[73] Assignee: The Lincoln Electric Company, Cleveland, Ohio

[21] Appl. No.: 33,333

[22] Filed: Mar. 18, 1993

[51] Int. Cl.$^5$ .............................................. B23K 9/20
[52] U.S. Cl. ................................ 219/130.5; 219/132; 219/125.1
[58] Field of Search .................. 219/132, 130.5, 137.2, 219/125.1

[56] References Cited

U.S. PATENT DOCUMENTS

| 3,581,050 | 5/1971 | Brown et al. | 219/137.2 |
| 3,581,051 | 5/1971 | Brown | 219/132 |
| 3,689,734 | 9/1972 | Burley et al. | 219/130.5 |
| 4,390,954 | 6/1983 | Manning | 219/130.5 |
| 4,631,700 | 12/1986 | Lapeyre . | |

Primary Examiner—Clifford C. Shaw
Attorney, Agent, or Firm—Body, Vickers & Daniels

[57] ABSTRACT

A method and system for controlling a welding cycle of an arc welder comprising: a number of digital programs stored in a digital memory device, with each of the programs including a plurality of digitally coded welding parameters indicative of selected functions of a specific welding cycle; a weld controller for converting the selected functions of a digital program into welding parameters at the output of the welder; a display panel having a group of switches located in a given pattern and a decoder network at a selected position for creating a decoded signal indicative of the activation pattern of the decoder network; means responsive to the decoded signal for activating said switches in either a first condition where the switches activate means for modifying a selected one of said digital programs or a second condition where said switches activate means for creating a program select signal corresponding to a given digital program; means responsive to a program select signal for selecting one of the programs corresponding to the program select signal; and, loading means for loading a selected one of the programs into the weld controller for controlling the welding parameters of the welder in accordance with the selected one of the programs.

44 Claims, 9 Drawing Sheets

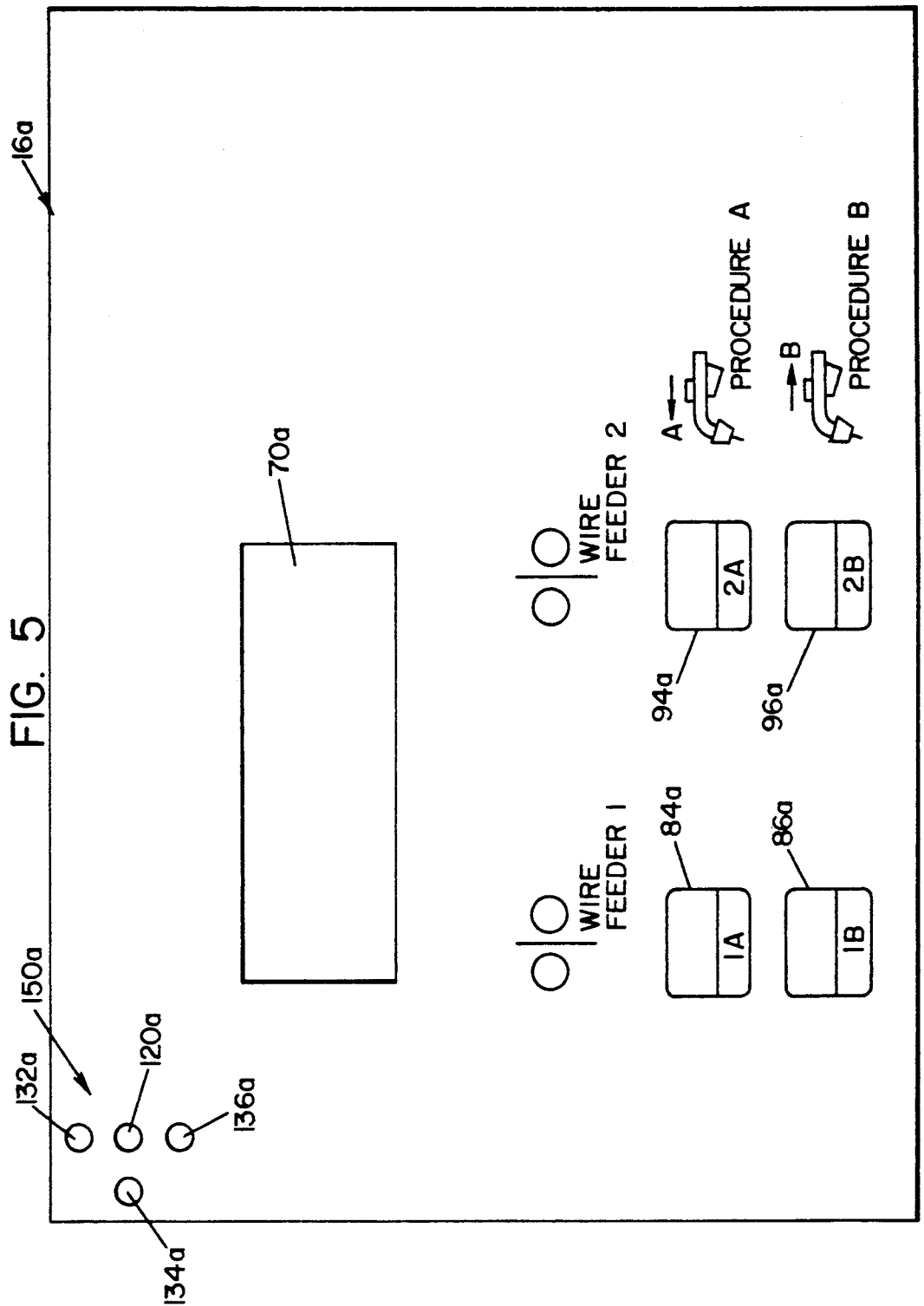

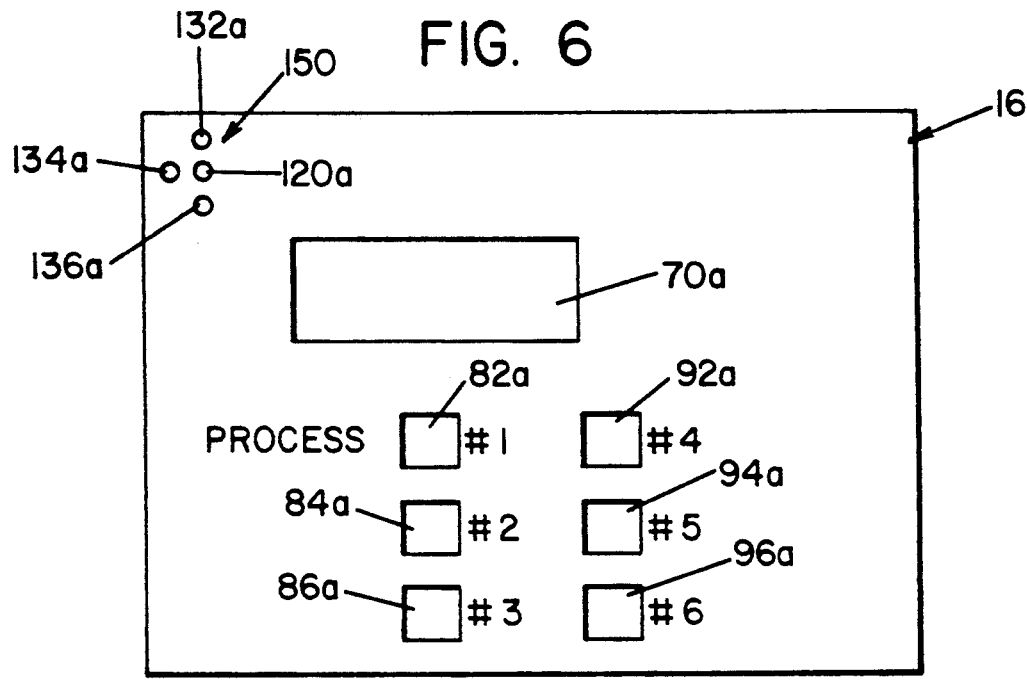
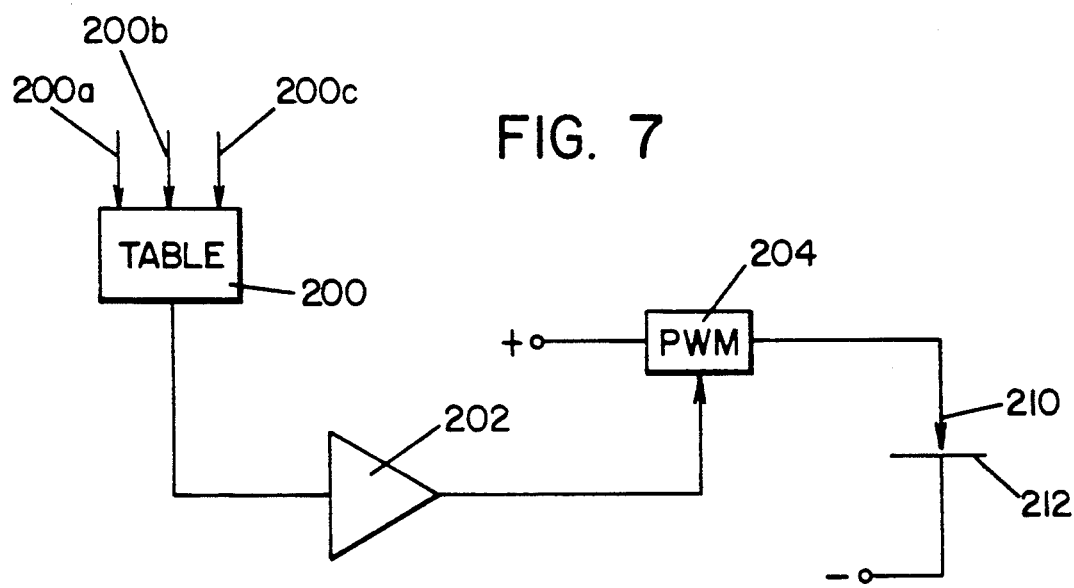

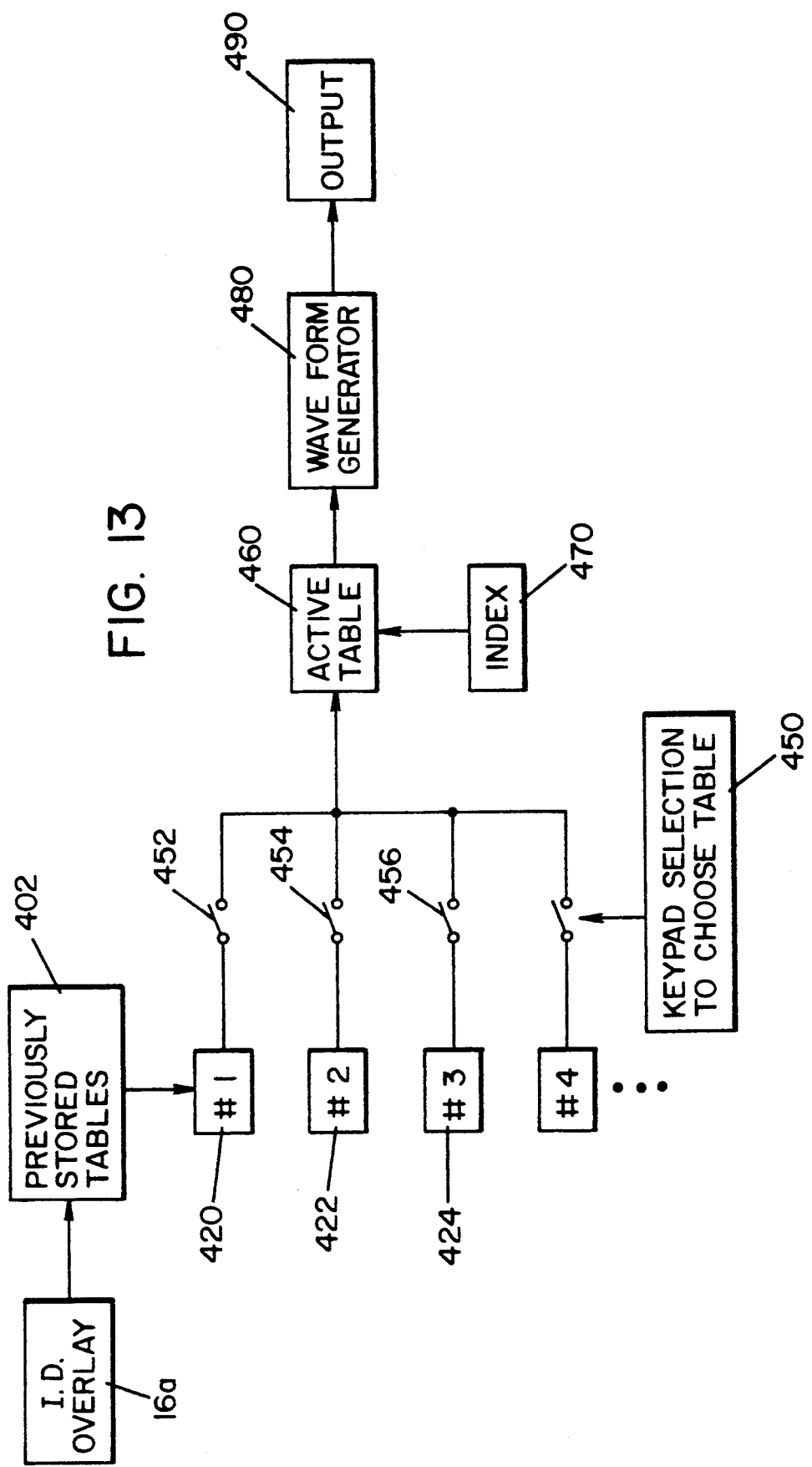

SYSTEM AND METHOD FOR CONTROLLING A WELDING PROCESS FOR AN ARC WELDER

The present invention relates to the art of arc welding and more particularly to a method and system for controlling the welding process or cycle of an arc welder of the type having a power supply driven by a weld controller having an output signal indicative of, and controlled by, several welding parameters such as current, desired voltage, wire feed, shielding gas, peak current, background current, ramp rate, and instantaneous power.

The present invention is particularly applicable to an arc welder of the type used for supplying a continuous wire or electrode to a welding operation at a preselected speed and with shielding gas; however, the invention is much broader and is particularly applicable for use with a welder that has a weld controller to cause the welding cycle or process of the welder to operate in accordance with one of a number of interrelated, and independently controlled, welding parameters.

In the welding field, it is common practice to provide a power supply having output terminals for directing a welding current across the gap between an electrode and workpiece with a weld controller that controls the welding current, welding voltage, and wire speed in a manner to perform a desired welding operation, such as TIG welding, gas metal arc welding, etc. In carrying out the various welding processes or cycles, an operator selects certain parameters and adjusts the output current according to the welding process being performed. This requires a substantial amount of manipulation and skill of the welder to perform the various welding processes in an optimum manner. For every welding cycle the various parameters should be controlled in accordance with well known welding art; however, this art is generally known by only a few highly skilled people, such as welding engineers. Consequently, when welding processes are performed by various operators, the resulting welding process is somewhat inconsistent and is not controlled in accordance with highly specialized technical characteristics indicative of proper welding procedure for each welding cycle or process and the vicissitudes of the specific welding operation being performed.

There is a substantial demand for a welding control system wherein each welding cycle can be controlled accurately and in accordance with proper welding technology irrespective of the operator performing the welding operation or the particular electrode size, the gas being used, and/or the feed rate being employed at any given time. It is known to provide dedicated programs for selection by the welding operator to perform prescribed welding cycles through the use of a weld controller. However, such prior devices merely provide a relatively small number of set programs which are performed digitally by the weld controller in conjunction with adaptive feedback control schemes so that the program welding cycle can be performed in accordance with the existing current, voltage and wire feed speed. Such systems do not provide flexibility and allow ease of selection and implementation of the programmed welding cycles having specific dedicated control parameters.

THE PRESENT INVENTION

The present invention relates to a system for controlling a welding cycle of an arc welder, which system comprises a number of digital state tables stored in a digital memory device or dedicated memory location. Each of these state tables includes a plurality of digitally coded welding parameters indicative of a selected function of a specific welding cycle. One state is performed and completed before the next state is processed. This continues until a total cycle is performed. A weld controller includes means for converting the selected function of a specific digital state in the state table into welding parameters at the output of the welder operated by the weld controller.

In accordance with a basic aspect of the invention, a display panel is provided with a group of touch pad, or membrane, type of switches located in a preselected pattern on the display panel and a decoder network means at a selected position on the panel for creating a decoded signal indicative of the activated pattern of the decoder network. Consequently, when the decoder network is activated, in accordance with a selected pattern, normally digital, a unique decoded signal is created. This decoded signal sets the functions of the switches and other indicia on the display panel. In one instance, the switches are used to access and modify or customize a given digital program. After the program or programs, by another decoded signal, have been customized they are stored in an intermediate memory. Then, another decoded signal sets the switches to load one of several memory located customized programs. The decoded network on the display panel can be used to select one of the digital state tables corresponding to a signal from a switch and then loads this selected one of the state tables into the weld controller for controlling the welding parameters of the welder in accordance with the selected one of the state tables. The decoded signal from the network also conditions the switches and indicator lights on the display panel to allow customizing of the state table or modifying of the table. In an alternative operation, a customized state table or program is loaded in a memory location for subsequent deposition into the weld controller by a further signal or a signal from a switch and indicative of the memory location. In this manner, merely by causing a certain decoding pattern to be exposed to the decoder network, a selected one of the digital state tables, normally after customizing, is transferred from a memory position, either dedicated or random, by activating one of the panel switches and loaded into the weld controller for subsequent control of the welding cycle. Consequently, the mere presentation to the display panel of a pattern to be decoded by the network indicates the functions of the panel switches. The switches can select one of the many state tables and transfer that state table to the welder for processing or load a table for customizing by the panel switches and then store the customized table or program for subsequent selection by operation of a panel switch.

In accordance with an important aspect of the present invention, the state tables or digital programs each have several indexed operating areas which allows them to be customized or modified according to operation of the various 10 panel switches that can change the various operating positions or areas of the individual state tables. The state tables relate to a particular group of states constituting a welding cycle to be performed. The indexed operating areas of a state table relate to the change of parameters for the given cycle to be performed. In accordance with this aspect of the invention, there is means responsive to one or more of the switches for changing the indexed operating area of the selected one of the state tables before it is loaded into the weld controller or stored for subsequent use. In other words, by manipulating the various panel switches, the wire speed, voltage, shielding gas, or other parameters can be employed for selecting portions or areas of the state table for a given process to be performed by the welder.

In accordance with another aspect of the invention, the switches on the display panel can be used for changing the individual parameters of the selected one of the state tables before it is loaded into the weld controller. These switches can customize the state table to provide a pulse shape or profile desired by a welding expert.

In accordance with still a further aspect of the present invention there is provided a means for loading a selected one of the state tables, after it has been appropriately customized or adjusted, into a first intermediate memory device and means for loading a selected one of the state tables into a second intermediate memory device. Several other intermediate memory devices can be provided for separate and distinct customized welding tables or digital programs that have been adjusted to prescribed parameters of the desired welding cycles. Consequently, when an operator is ready to perform a given cycle or process, an operator merely depresses one of the membrane switches on the display panel. This selects a given cycle with previously adjusted parameters or otherwise customized and stored as a digital program.

By providing these features, the switches on the display panel can first select the desired state table, then adjust or customize the state table in accordance with the parameters to be experienced in a given process. The state table corresponds to a particular process identified by a specific decode number. Thereafter, this modified or customized state table is loaded into a particular addressed memory device. When a weld controller is to operate a finite number of individual welding cycles, each of these modified or customized welding tables is stored in a particular memory device at a known address. The operator merely needs to depress a particular one of the available switches creating a given address to call up and load into the weld controller a particular state table corresponding to the weld cycle to be performed.

In accordance with the present invention, a welding engineer can select a desired state table for a given type of welding process at the display panel, modify or customize the parameters of the selected state table and then store the modified or customized state table, in digital form, in a given memory location having a known address. Several state tables are loaded into individual memory locations which are then manually selected by an operator in accordance with the depressing of a selected one of the switches on the display panel corresponding to the desired welding process to be performed by the operator. The operation is available when the display panel is converted to a "memory run" operation as opposed to a table customizing mode.

To facilitate the present invention, overlays are provided that are mounted onto the display panel. A first type of overlay is for the purpose of adjusting or customizing the weld cycle or process to be performed by the weld controller. The overlay has a portion having a unique code and associated with the fixed decoding network on the display panel. The overlay has an assigned digital code indicative of the particular overlay and the function to be performed when the overlay is in place. When this overlay is mounted on the display panel with the coded portion over the decoding network of the display panel, the control system identifies the particular overlay and accesses the state table in a known memory bank of the system. The accessed state table corresponds to the generic process to be implemented by the system and adjusted through the use of the overlay on the display panel. The overlay has indicia areas covering the various switches in the control panel. These switches are converted, in response to a given overlay, into a mode that allows decrementing and incrementing of a parameter in the state table by using the touch pad switches. A displayed readout value can be adjusted by use of the manually operated switches. Thus, the parameters of a selected portion of a cycle are dictated by the particular overlay placed over the display. As each of the switches is operated, the particular parameter at a given location in the welding cycle accessed by the overlay being used is changed by a skilled person, such as a welding engineer. This manual procedure is continued until the parameters of all areas or states of the cycle are modified in accordance with the desires of the welding engineer. Consequently, the welding cycle associated with the overlay is optimized. The optimized modification of the state table parameters is then stored in the system. After storing one or more customized state tables that have been modified by the welding engineer using the process type overlays, the display panel is adapted to receive an overlay which merely selects one of the customized cycles, i.e. state tables, stored in memory. This memory select overlay is also provided with a decoding pattern like the process adjusting overlay. When a "memory run" overlay is employed, the overlay is decoded so that the switches on the display panel merely select the stored state tables that have been modified and stored at a known address. Consequently, the operator merely places onto the panel an overlay which identifies certain memory locations or addresses. By activating a switch at a given location identified by the overlay, a particular stored process cycle is loaded into the weld controller for operating the welder. In this manner, the operator needs to only select one of several welding cycles which have been previously adjusted and manipulated for optimum operation by a person skilled in the welding art. Of course, a second run overlay could be used for selecting other stored welding cycles to be performed by a welder.

By using the present invention, an overlay is placed over the display panel so that the cycle can be customized by merely manipulating switches on the display panel as identified by the printing on the overlay. Thereafter, a second overlay, or group of overlays, can be used for selecting the stored state table or digital program to perform the desired welding cycle selected by the operator.

The primary object of the present invention is the provision of a system and method for controlling a welding cycle or process of an arc welder by employing a large number of digital state tables or digital programs which are selected, adjusted, stored and retrieved by manipulation of switches on a single display panel associated with a weld controller for actually operating the arc welder.

Yet another object of the present invention is the provision of a system and method, as defined above, which system and method can be employed for a wide variety of welding cycles, both the intermittent pulse type and continuous pulse type.

Yet another object of the present invention is the provision of a system and method, as defined above, which system and method can provide a large number of welding cycles that are customized and employed for controlling the weld cycle of an arc welder.

Yet another object of the present invention is the provision of a system and method, as defined above, which system and method can be easily implemented by providing two overlays, one of which is employed for the purpose of structuring a generic welding cycle on a digitized program or state table and the other of which is employed for the purpose of selecting a particular welding cycle to be performed by an operator to simplify the set up.

These and other objects and advantages will become apparent from the following description taken together with the accompanying drawings in this application.

BRIEF DESCRIPTION OF DRAWINGS

FIG. 5 is a plan view of a "memory run" overlay constructed in accordance with the present invention for selecting a memory stored state table customized into a desired welding cycle profile for implementation by the welder, as shown in FIG. 1;

FIG. 6 is a schematic plan view of a "memory run" overlay similar to the overlay shown in FIG. 5, and used in practice, for selecting a particular process to be employed by a welder in accordance with a customized state table stored in a particular memory location in accordance with the present invention;

FIG. 7 is a schematic wiring diagram illustrating control of the power supply by the state table in implementation of the present invention;

PREFERRED EMBODIMENT

As indicated before, it is known to control an arc welder with a fixed program which can be digitally stored for the purpose of controlling certain parameters of a welding cycle while also monitoring operating conditions, such as voltage and/or current to modify the programmed welding cycle. Such system employs a power supply, wire feeder, program selecting units and a weld controller for operating the power supply in accordance with the preset program, as modified in a closed loop arrangement by welding parameters, such as current and voltage. Such devices require the storing of a finite number of fixed programs at addresses which must be known to the operator for the purposes of selecting the program and implementing the fixed program by the weld controller. This type of known concept presents serious limitation to the implementation of a wide variety of weld cycles and prevents an all purpose weld controller that can implement a wide variety of programs which can be customized at the facilities of the end user. The present invention overcomes such disadvantages and presents an extremely versatile arrangement which uses custom state tables formed from digitally represented states taken together to define a program or pulse profile of a welding process. Of course, other digital programs could be used in practicing the invention. Consequently, a welding installation performs a given weld cycle that can be programmed within certain constraints at the facility of the end user. The various customized programs for different welding cycles can be easily implemented in a production facility by merely selecting a certain one of a finite number of preprogrammed, customized state tables or digital programs used to implement selected welding operations or cycles.

The present invention relates to a novel system and method for selecting digital state tables or programs indicative of a preselected welding cycle or pulse profile in a manner that can customize the state table and then implement a selected customized state table at a welding facility. This invention does not relate to, nor is it limited by, the particular cycle, process or pulse profile being implemented or the parameters being adjusted either manually or adaptively by sensed feedback concepts.

Figure 1:
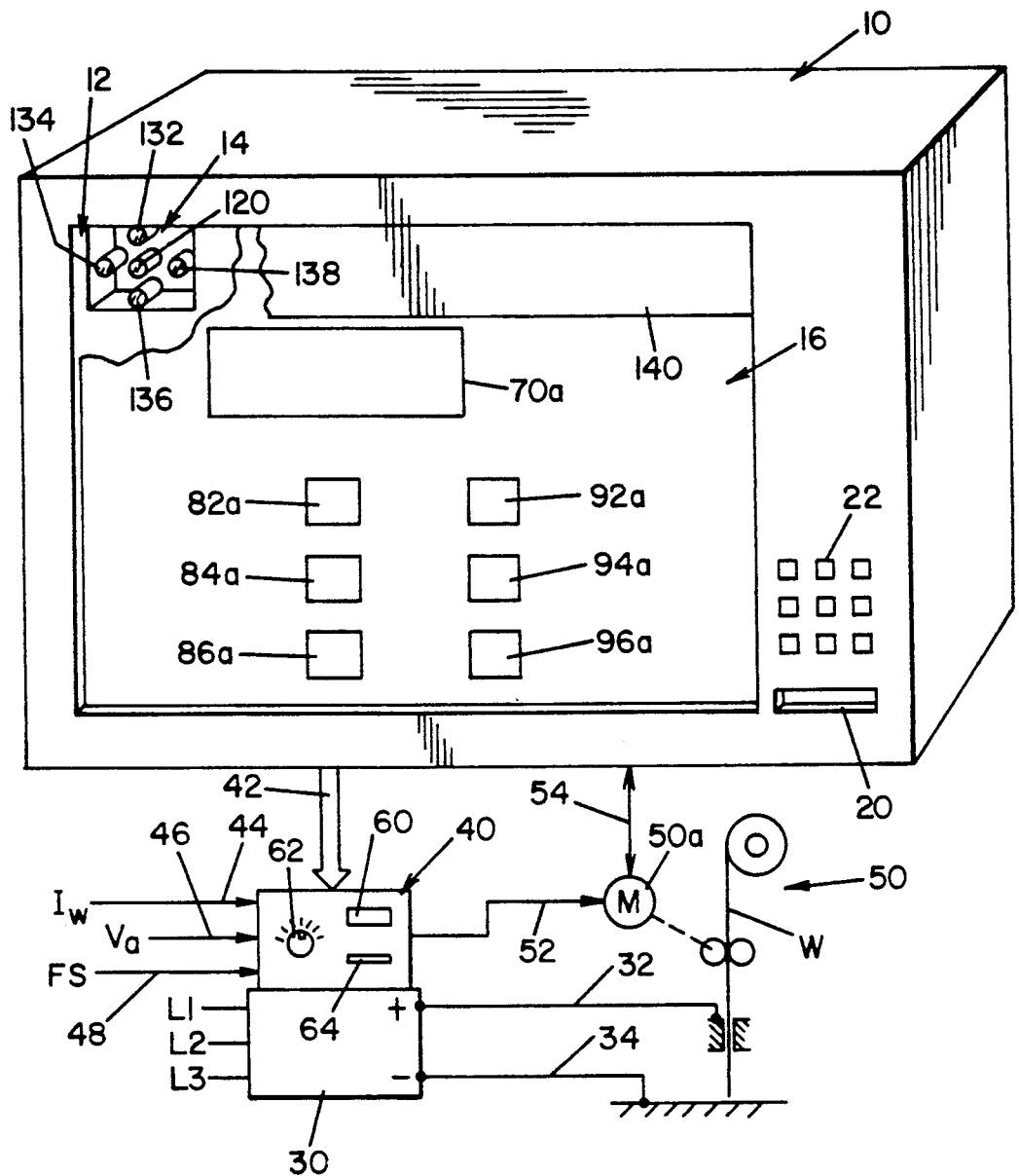
FIG. 1 is a partially pictorial view of the preferred embodiment of the present invention with schematic representations regarding the welder and welding operation.
Figure 2A:
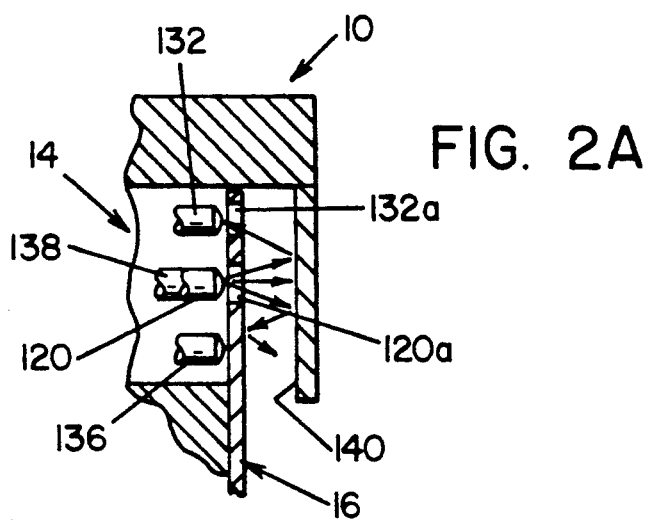
FIG. 2A is an enlarged partially cross-sectioned view of the preferred embodiment illustrated in FIG. 1.
Figure 2:
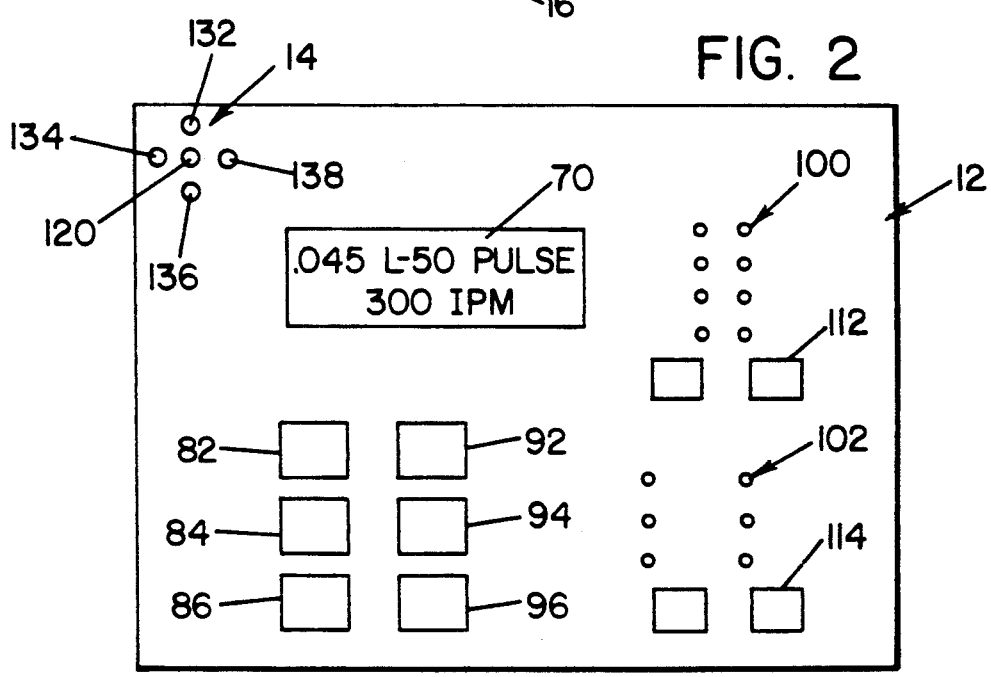
FIG. 2 is a schematic layout view of the display panel employed in the preferred embodiment of the present invention.
Figure 3:
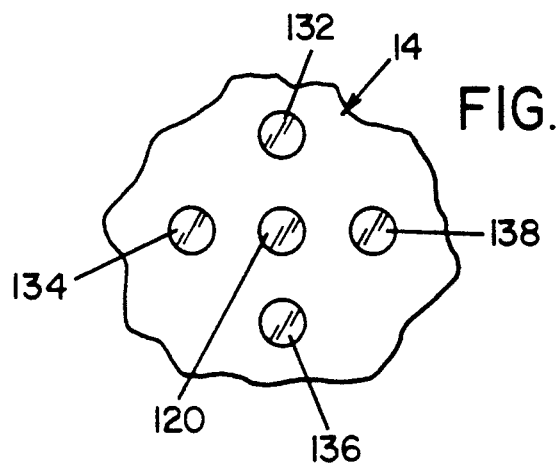
FIG. 3 is an enlarged partial view showing the decoder network employed in the preferred embodiment of the present invention as shown in FIG. 1.

Referring now to the drawings wherein the showings are for the purpose of illustrating a preferred embodiment of the invention only and not for the purpose of limiting same, FIG. 1 shows a PC interface 10 with an exposed display panel 12 and having a decoder network 14 so that an overlay, schematically illustrated as overlay 16 for illustrative purposes, can be mounted over display panel 12 for the purposes of implementing the features of the novel system and method constituting the present invention. Details of the display panel 12, decoder network 14 and their relationship with the novel overlay concept of the present invention are schematically illustrated in FIGS. 2, 2A and 3 which showings are to be considered in combination with the disclosure of FIG. 1. In accordance with the present invention, a large number of state tables or "look up" tables are converted to digital information or data which contains all of the parameters for performing a given generic welding process, such as TIG, MIG synergetic MIG/MAG pulse welding, etc. Each of the state tables, in accordance with standard software technology, relates to a finite welding cycle which is to be performed in a series of individual steps or states by the welding installation shown schematically in FIG. 1. The steps or successive states are defined by specific parameters. The various state tables or additional state tables can be loaded into PC interface 10 by a standard state table disk drive 20 for receiving floppy disk containing a number of state tables or by means of an electronic memory device such as an EEPROM cartridge by connecting a PC by way of a standard RS232 serial loop, a device for accepting a floppy disk or by means of a cartridge containing an integrated circuit memory device. In addition, a hard drive contained within the PC interface can store state tables within interface 10. Buttons 22 are schematically illustrated as being on interface 10 for the purposes of manipulating digital information within the unit; however, such buttons are normally not employed in practice, since the interface is either loaded by floppy disk or with a hard drive to contain the necessary large number of state tables which can be individually and selectively accessed by interface 10. Interface 10 is a digital computer unit forming a window between the operator and power supply 30 having leads 32, 34 connected across a welding operation. In accordance with standard practice, weld controller 40 includes an interconnect line 42 for receiving digital information from interface 10 in accordance with manipulation of one or more overlays 16, forming a novel aspect of the present invention and which overlays will be explained in detail later.

Weld controller 40, in accordance with standard practice, includes inputs 44, 46 and 48 so that the actual welding current $I_w$, the arc voltage $V_a$ and the wire feed speed FS can be sensed and inputted into controller 40, on lines 44, 46, 48, respectively, for the purposes of adaptively implementing the state table loaded from interface 10 into controller 40 for performing any given welding process, pulse profile or cycle. In accordance with standard practice, a digitally loaded program from interface 10 is loaded into controller 40. Controller 40 inputs information from the welding operation through lines 44, 46 and 48 for performing the particular welding cycle with the architecture constraints of the cycle dictated by the state table or look up table loaded into the controller from the interface. Wire feeder 50 is controlled by weld controller 40 through control line 52 for driving motor 50a in accordance with the desired feed speed FS of the particular welding cycle of the customized state table loaded into the weld controller. Feeder 50 reads potentiometers in interface 10 through bidirectional line 54 for feed speed and voltage trim. This information is communicated to controller 40 which gives a feed speed command in line 52.

Referring now more particularly to weld controller 40, this controller has a standard read out meter 60 and a manual control 62 for controlling wire speed or any other desired manual manipulation to be performed by the welding operator during the weld cycle. In many instances, there is no manual manipulation of any welding parameter during the processing of a customized welding cycle by controller 40. The illustration of a manual control 62 in the form of a knob is illustrative in nature and shows the versatility of employing the present invention. In accordance with another possibility of implementing the present invention, controller 40 can have a floppy disk drive 64 for the purpose of loading additional information into the controller after a given state table has been customized and loaded, into controller 40 for the purposes of implementing a desired welding cycle of power supply 30.

The present invention relates to a system and method which is implemented at PC interface 10 by the use of a disposed display panel 12. As shown in FIG. 2, the display panel includes a digital read-out meter 70 positioned in a known selected location on panel 12 and constituting an alpha-numeric display to provide continuous update monitoring data for the control system. In addition, touch pad type switches 82–86 and 92–96 are positioned at a fixed selected location on panel 12 for the purpose of subsequent implementation of features printed on an overlay, schematically illustrated as overlay 16 in this general description of the invention. A group of LED lights 100 is arranged in a selected pattern on panel 12 as shown in FIG. 2. In a like manner, a specific pattern or grouping of LED lights 102 is contained on panel 12. Below the group 102 of LEDs are two additional touch pad switches 112, 114. The particular construction pattern and arrangement of the LED lights, touch pad switches and read-out meter of panel 12, as shown in FIG. 2 is merely representative in nature. Any number of switches, read-out meters, lights, etc. can be used on the visually exposed display panel 12. Consequently, display panel 12 provides input to the interface 10 and outputs from the interface so that the welding cycle can be controlled, selected, customized and otherwise manipulated from display panel 12.

For the purposes of identifying the particular overlay 16 being processed by and through implementation of display panel 12, the panel includes a decoder network located at a selected position on the panel for creating a decoded signal used by interface 10 to determine the operation of the switches and other indicia on panel 12. With one type of decoded signal the switches perform specific functions when actuated in accordance with the printed material contained on overlay 16. Interface 10 includes means responsive to the decoded signal from network 14 for selecting one of the generic state tables corresponding to the specific decoded signal and sets the switches, etc. of panel 12 to customize the selected digital program or table. The table selected is then stored in the interface for customizing. In accordance with another type of decoded signal, a customized program is loaded into the weld controller 40 for controlling 10 the welding parameters of power supply 30 in accordance with the selected one of the customized state tables determined by the signal from decoder network 14 and operation of one of the panel switches 82–86 and 92–96. The mode of operation, i.e customizing the process or outputting a state table is controlled by the type of overlay which is detected by the code received at network 14. The particular decoder network 14 shown in FIGS. 1–3 is different than the decoder network shown in FIG. 10, which is the network that is to be the final decoder network arrangement. Network 14 includes a central light 120 surrounded by four light responsive detectors 132, 134, 136 and 138. As shown in FIG. 2A, a mirror 140 is mounted over the decoder network 14, as best shown in FIGS. 1 and 2A. In the same relative position as network 14, overlay 16 includes an activation pattern of corresponding holes 132a, 134a, 136a and 138a which correlate to detectors 132, 134, 136 and 138, respectively. The activation pattern of overlay 16 includes a particular selection of the corresponding openings or holes in the overlay. As shown in FIG. 2A, this particular overlay 16 has only one opening 132a. Thus, light from emitter 120 shines through opening 120a and is detected by LED 132. Thus, when interface 10 interrogates panel 12 for an overlay detection, light 120 is initiated. The pattern of detected lights in LEDs 132–138 provides a decoded signal which is read as the table select signal from panel 12. As can be seen, the mere installation of overlay 16 over panel 12 allows detection of the type of overlay being processed. This overlay being processed, in the process customizing mode, identifies the generic state table to be implemented and modified by manipulation of the various switches on panel 12 for customizing the selected generic state table. This decoded signal sets the switches for use in customizing the state table or digital program. In addition, in a second type of overlay, interface 10 performs a second mode where the decoded signal from network 14 selects one of a series of groups of memory stored customized state tables so that manipulation of the switches on panel 12 will select one or more of the previously customized and stored state tables of the group selected by the signal from network 14. The selection of a state table for customizing and/or the output of one of several previously customized state tables can be identified and implemented by merely decoding the activation pattern printed or formed on the overlay.

In accordance with another embodiment of the present invention, interface 10 includes a mode select switch which indicates that the activation pattern of the overlay is to be used for selecting and/or implementing a specific state table or is to be used for selecting one of several previously customized state tables. The first operation is referred to as a "process" overlay, which selects a given state table indicative of an overall process and allows the face mounted elements of panel 12, such as the switches, to be manipulated for the purposes of customizing that selected state table. The second mode of operation involves a "memory run" operation wherein a finite number of customized state tables is stored in memory locations or addresses and manipulation of the switches on the face of panel 12 selects the particular customized state table stored in a particular group of memory addresses. This second mode of operation is merely ancillary to the basic concept of the present invention wherein the overlay identifies the particular generic state table, which is then customized by manipulation of the switches on panel 12. Then the system software outputs, or loads, the customized table into controller 40 through line 42 for operation of the welder. The memory storage of these customized state tables is a further extension of the present invention and the function can be either implemented by the activation pattern for network 14 or by a switch or selector arrangement on the interface. This second mode of operation, i.e. "memory run", is schematically illustrated as overlay 16 as shown in FIGS. 1 and 6 or overlay 16a in FIG. 5. Indicia 82a–96a are printed on overlay 16 and are located exactly over switches 82–96 shown in FIG. 2 for the exposed overlay 16a. After a group of customized state tables is stored in PC interface 10 by manipulation of the various switches on panel 12, an overlay such as shown in FIGS. 1 and 6 can be employed. The operator merely depresses one of the switches 82a–96a. This selects the desired memory stored customized state table. This memory stored state table is then outputted, through line 42, to controller 40 for controlling the welding operation. Consequently, an operator, in production, merely needs to know which of the various cycles is to be employed. By depressing one of the areas on overlay 16a, the state table or program customized for that particular cycle by the welding engineer is implemented by controller 40.

Openings 70a of overlays 16, 16a, 16b are each aligned with read-out meter 70 of panel 12. In some installations, the particular welding cycle being processed can be displayed through opening 70a of the overlay 16a. This verifies visual representation to the operator which particular welding cycle is being processed by weld controller 40. An overlay for this purpose is schematically illustrated in FIG. 6 where activation pattern 150 for identifying the overlay includes three openings 132a, 134a, and 136a. The welding processes of a selected group are identified as numbers 1–6. An operator merely places overlay 16 on display panel 12. Activation pattern 150 identifies the overlay as a run memory overlay so that depressing areas 82a–96a selects one of six customized state tables of a group selected by the overlay and loads the selected table or digital program into weld controller 40. The implementation of this same concept in practice is illustrated in FIG. 5 wherein overlay 16a has only four manipulative areas 84a, 86a, 94a and 96a over switches 84, 86, 94 and 96, respectively. In this illustrated embodiment of the invention, the activation pattern 150a indicates the particular "memory run" overlay 16a which has been placed by the operator or welding engineer over display panel 12 of interface 10. If the operator wants to proceed with welding procedure A with a wire feeder No. 2, he merely touches area 94a. This calls up the stored parameters of a state table corresponding to the selected process. Panel 12 has been shifted to a memory address mode by the code pattern 1502 on overlay 16a. In this mode, depressing any of the six switches 82–96 loads the selected, customized program or state table in welding controller 40.

Figure 4:
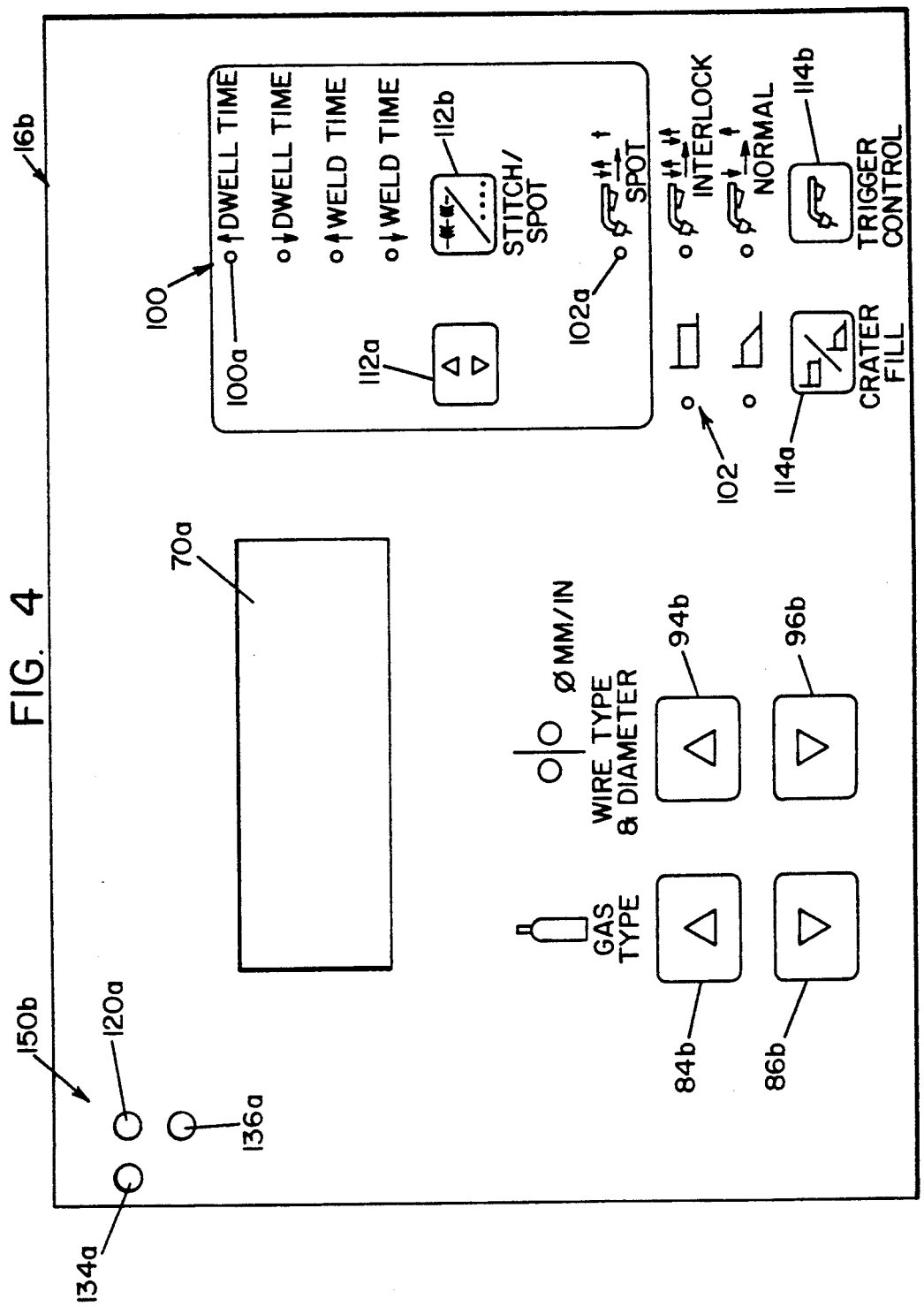
FIG. 4 is a plan view of a process customizing overlay constructed in accordance with the preferred embodiment of the present invention for first selecting and then modifying or customizing a state table in accordance with the present invention.

Referring now to FIG. 4, overlay 16b is used for selecting and modifying the parameters in a specific digitally stored, generic state table in either a floppy disk, memory card, or memory address within interface 10. Activation pattern 150b includes openings 134a, 136a. This overlay code indicates the particular table to be selected and customized. In the alternative, the decoded signal from network 14 could condition panel 12 to select a given program to be customized. In both of these instances, the decoded signal from network 14 shifts the switches on panel 12 to a condition allowing the switches to customize a state table or digital program whether selected by the decoded signal or otherwise. After the state table has been selected the parameters of the state table are adjusted by depressing areas 84b, 86b, 94b, 96b, 112a, 112b, 114a, or 114b. Lights 100, 102 indicate which of the functions are being processed by the various switches. Manipulation of area 84b indexes upwardly to the type of gas. This information is displayed in meter 70 and is seen through opening 70a. Areas 94b, 96b are manipulated to index upwardly or downwardly to select the wire diameter sizes for the wire to be used in a particular process being performed. The pressing area 112a indexes the state table through the various times. Area 112b allows selection between STITCH and SPOT. The light 100a in group 100 and light 102a in group 102 indicate which of these functions have been manually selected by switches at areas 112a and 114a, respectively. Area 114a allows selection of the type of crater fill. Area 114b allows selection of the type of trigger control. By manipulating the various switches shown in FIG. 2, the selected generic state table is customized for a given process. This customized state table is then either implemented by being directly loaded into weld controller 40 or by being loaded into a memory for selection by an overlay 16a as shown in FIG. 5. In the preferred embodiment, the customized state table is loaded into a particular memory location in interface 10. Then a "memory run" overlay, such as overlay 16a, in FIG. 5 and overlay 16 of FIG. 6 is positioned over display panel 12 for selecting the desired memory location from a group identified by the decoded signal from network 14. Indeed, the combination of these two features, which can be implemented by overlays having displayed information useful for the welding operation and identifiable by network 14 for conditioning interface 10 is an important feature of the present invention.

In accordance with an aspect of the invention, the state table or program is selected by various diverse conditions. Such a feature is schematically illustrated in FIG. 7. A particular state table or program 200 is selected, for example, by a combination of a process code on line 200a, a voltage trim adjusted code on line 200b and a wire feed speed code on line 200c. This selected table is loaded into weld controller 40 for the purposes of controlling the output current of the power supply 30. Table 200 controls the instantaneous operation of amplifier 202 in accordance with a given one of a sequence of states forming the customized weld program 200. The power is controlled through a pulse width modulator 204. In this manner, the precise welding current between electrode 210 and workpiece 212 is controlled in accordance with digital information constituting customized state table 200, as the states of table 200 are being implemented by controller 40. Various other conditions selectable on panel 12 could be used to identify a specific digital program.

By using the present invention, additional operations can be employed by merely loading additional generic or semi-generic state tables into interface 10. The interface units are provided with dedicated memory areas for fixed 10 stored state tables. In other embodiments, floppy disks, memory card etc. are loaded into drive 20 and manipulated by buttons 22 for updating the available state tables. In this manner, the invention relates to a system and method which can be updated, improved and changed without changing any structure, except the software which defines the state tables for the various types of weld cycles. Some state tables may have both fixed parameters and selected parameters that can be changed or customized. By employing the overlay concept, persons developing the state tables for a particular welding cycle need not be aware of programming techniques for the microprocessor which forms the basic internal component of interface 10. The present invention relates to a system that is structured such that no knowledge of programming or electronic circuitry is necessary to create the desired weld cycle state table or implement this table for production welding. The welding engineer or operator merely needs to be familiar with those features that render the welding operation and his installation acceptable. Controller 40 includes software that is employed for running a state table which defines a particular weld cycle. PC interface 10 is the operator's access to the control circuit. This interface is a window for an operator to access and customize state tables for a given welding process. Consequently, the hardware used to implement the present method and system does not have any dedicated welding procedure. All welding procedures are stored in the PC interface or on a floppy disk that can be added to or subtracted from the interface. Consequently, complete versatility is assured by implementing the present invention.

Figure 8:
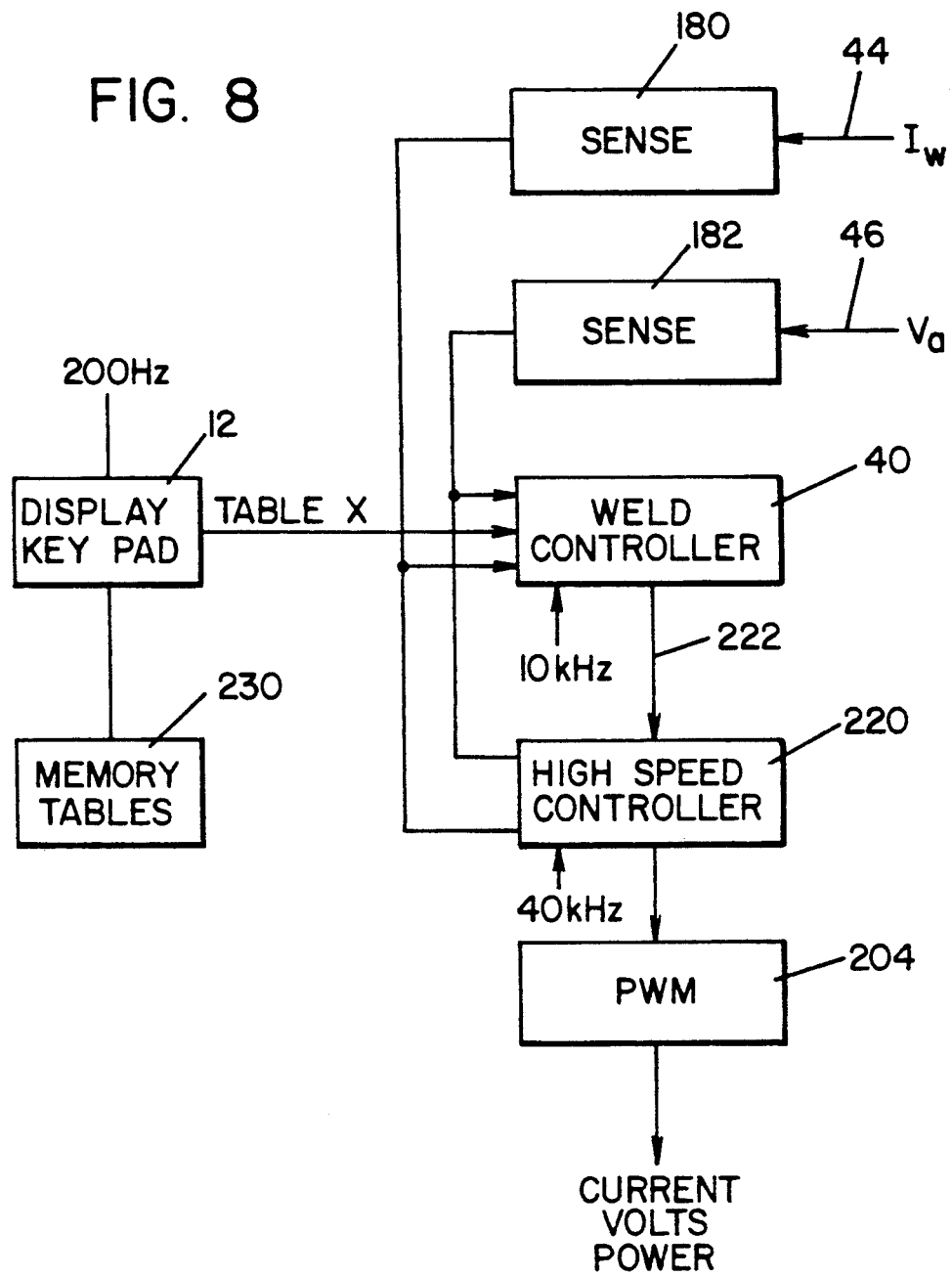
FIG. 8 is a block diagram showing a preferred embodiment of the system and method constructed in accordance with 10 the present invention.

FIG. 8 illustrates a block diagram of the operation of controller 40 with the numbers corresponding to those numbers employed in FIGS. 1-3. This description relates to the actual implementation of the present invention and is being described for completeness but is not needed to understand and use the present invention in any welder when controller 40 is operated by a digital program. In practice, a digitally structured state table is loaded into the weld controller 40. The state table is essentially a complicated function generator which operates at 10 kHz. The current and voltage is sampled on an input A-D converter 180 and converter 182. A number of voltage and current readings are averaged to determine the voltage and current for a particular cycle. These voltage and current values are implemented by weld controller 40 which includes a high speed controller 220. Weld controller 40 is sequenced at *10* kHz. It is the responsibility of the weld controller to generate a current, voltage or power command in line 222 for high speed controller 220. The high speed controller executes a complete control cycle or procedure at 40 kHz. It is the responsibility of the high speed controller to generate a duty cycle for each power switch based upon the current, voltage or power command input through line 222. This duty cycle controls the output current of the welder. Voltage and power are controlled by pulse width modulator 204. This feature is schematically illustrated in FIG. 7 as employing a pulse width modulator 204 for controlling the output current across electrode 210 and workpiece 212. Display panel 12 of interface 10 is read and communicates with memory tables in storage device or memory 230 as shown in FIG. 8. The welder controller, in practice employs two separate microprocessors which compute a control cycle at 10 kHz and control the waveform. The second microprocessor in the controller loads variable parameters in and out of the fast processor 220 as the arc condition changes.

In operation of the practical embodiment, overlay 16b, as shown in FIG. 4, indicates the particular generic state table to be implemented and modified. The selected state table corresponds to a particular welding cycle printed on the face of overlay 16b. After the state table corresponding to the signal from network 14 is accessed from memory 230, it is stored in interface 10 to be customized by manipulation of various switches on display panel 12. The signal from network 14 causes the elements, such as switches, on panel 14 to be employed as inputs to customize the digital program selected by the decoded signal from network 14 in response to the identification of the unique overlay. The functions of the switches for this particular table are displayed to the operator or welding engineer through indicia or representations printed on overlay 16b. After the program has been customized and in this practical embodiment, the customized state table is stored in another memory location for processing by a "memory run" overlay, such as overlay 16a in FIG. 5. The selected customized state table or program is outputted through interconnect line 42 to weld controller 40 for implementation. Closed loop manipulation of the welding cycle is allowed. The welding current, voltage, or possibly, wire feed speed is used to adjust the particular area of a state table or program being processed. For instance, if a state table or program has a certain group of parameters defining states for 100 amps, 110 amps, etc., the feedback current will index the operating area of the state table to the area corresponding to the actual current being processed. In accordance with another aspect of the invention, this manipulation of the area of a state table which is to be processed can be controlled manually by a knob 62, which controls the display of read-out meter 60, as shown in FIG. 1. In addition, the weld controller 40 may include a floppy disk input drive 64 for the purpose of providing adaptive information for any particular type of welding process being performed in accordance with a selected state table stored in and being processed by weld controller 40.

Each state table or program includes a unique set of information that would determine what function to use, what value to regulate the output to, how to configure the outputs, and how to go to the next successive state. These states of a state table defining a particular welding process do not have to be processed in a specific order. The number of states of a state table are limited to the amount of RAM available. There are, in the preferred embodiment, 160 words of memory reserved for the state table in interface 10. The first state, state 0, is reserved for a known starting point. This is the only state of a state table that the welding controller can be forced into by an external command. Controller 40 is controlled at 10 kHz. There are three basic functions for controlling the welding machine. The modes of control are current, voltage and power. Each of these three basic functions can be expanded to include level, ramp, square or exponential functions. All of the functions have a common check to determine if it is time to leave that state and proceed to the next state. If the conditions are met it will then progress to the next state. If the conditions are not met, there will be a new current command for the current controller. Other arrangements can be employed for implementing the customized program or state table. The particular implementation is not part of the present invention which relates to the overlay decoding concept and control concept as explained in more detail with respect to FIGS. 1-5.

Figure 9:
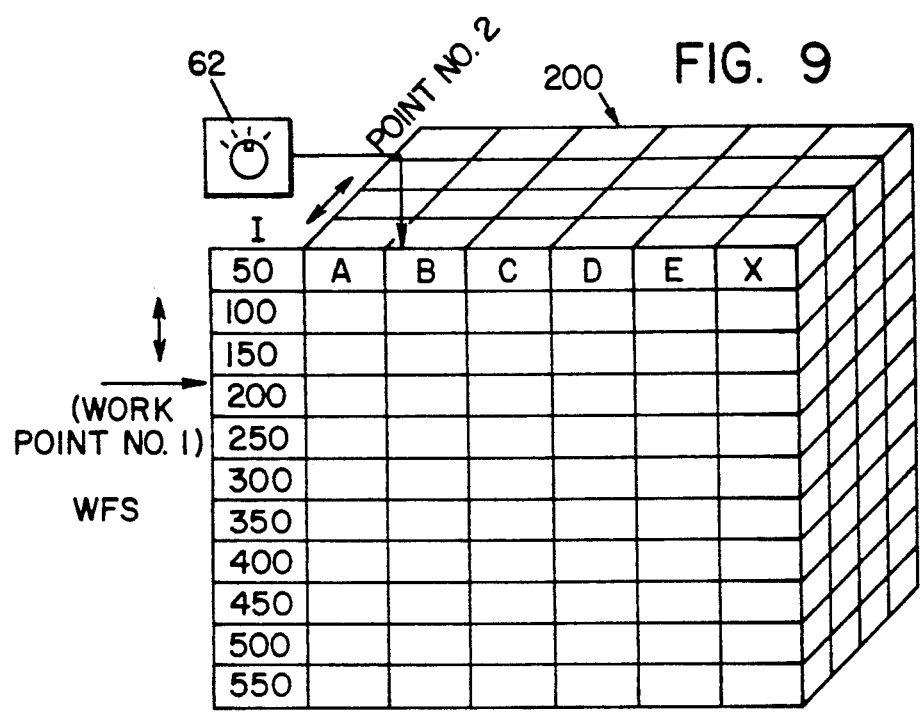
FIG. 9 is a schematic representation of a digitally constructed state table stored in the memory of the preferred embodiment of the present invention for implementation by the weld controller in accordance with the present invention and showing the area indexing concept of the state table.

Referring now to FIG. 9, a state table is illustrated schematically wherein state table 200 is represented as three dimensional and includes a number of individual, successively executed states A-X. These states may include feed speed, background current, welding current, original current, ramp configuration, peak current and any number of parameters. The area of a selected table can be adjusted manually by an external device such as the wire feed control 62, schematically illustrated as work point No. 1 in FIG. 9. In addition, each indexed area of a table or program in the direction perpendicular to the page has a particular portion relating to inductance. As the wire feed changes, the area of the state table to be processed by controller 40 is indexed in a closed loop fashion in the vertical direction. In this manner, a state table indicative of a given generic process cycle is controlled by being selected, by being customized through the front display panel 12 to change parameters and profiles and by being adjusted adaptively by sensing certain parameters, such as current, voltage and power. Various systems for implementation of the generic state table or program can be used in the present invention. In this manner, only generalized or generic processes need to be stored as a state table. In practice, the tables or programs are customized by a welding engineer after a desired overlay 16b is placed over panel 12 to indicate the functions being adjusted when various switches on the front of panel 12 are manipulated while access to a specific state table is maintained. State table 200, as shown in FIG. 9, is expandable to dimensions in all axes which may be based upon inductance, softness, arc length, etc. In practice the shift in work point or area of the table is controlled by inductance and wire feed speed. Then the states at that level are processed as a given welding operation. Certain variables are equation constraints to effect voltage trim based upon stickout. This variation of the state table is a third work point concept.

Figure 10:
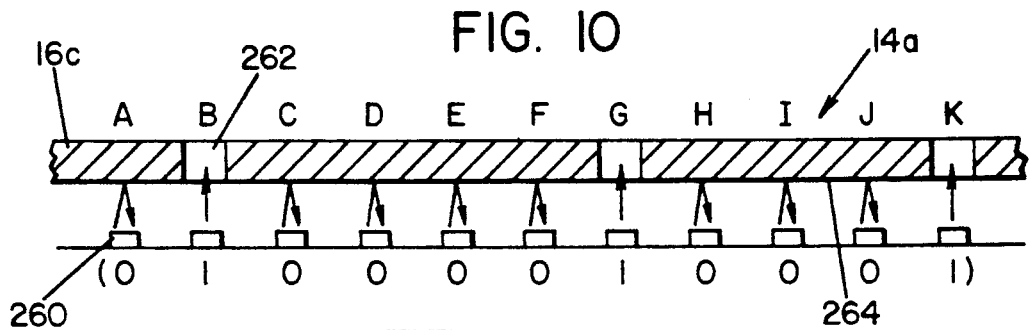
FIG. 10 is a cross-sectional view of a portion of the overlay constructed in accordance with the present invention showing a second preferred embodiment of the decoding network employed by the present invention.

FIG. 10 illustrates the decoder network 14a to be used in practice wherein overlay 16c has a large number of combined light sources and detectors 260 arranged in a given pattern, illustrated as a straight line. Openings 262 in overlay 16c provide a binary code identifying the particular overlay 16c. An opening 262 represents a logic 1 in a binary code. If light is reflected from the back surface 264 of overlay 16c, a logic 0 for the digital code is identified. In this manner, a large number of overlays can be decoded to create sufficient information for interface 10 to know whether the overlay is a "process" overlay, such as shown in FIG. 4, or a "memory run" overlay, as shown in FIG. 5. In addition, the decoding network is sufficiently versatile to identify a specific state table to be accessed and updated as well as the necessary information to shift the switches to provide the particular functions of the various switches 82-96 on the front of display panel 12.

Figure 11:
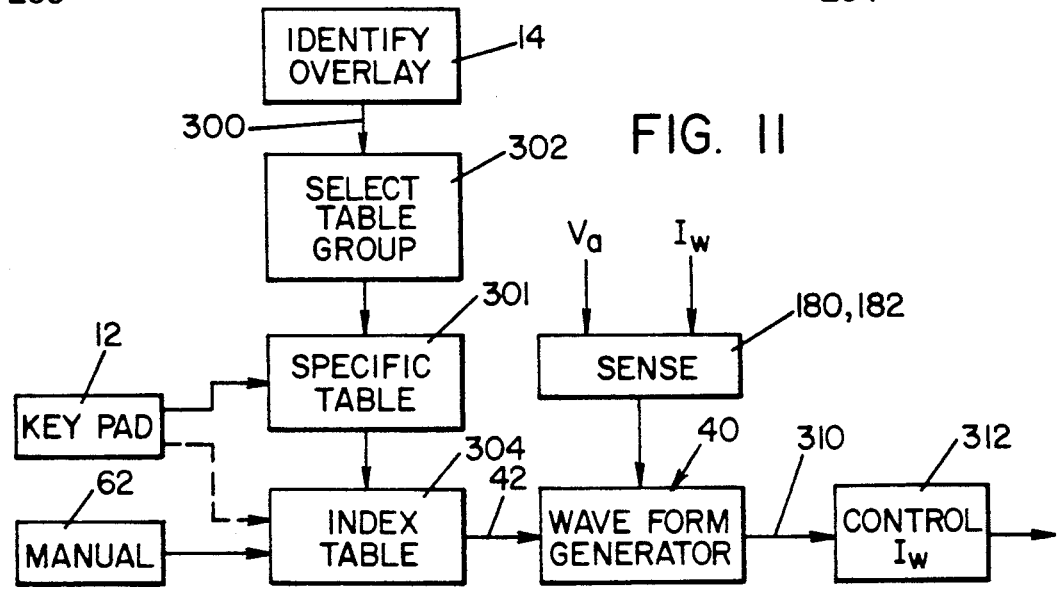
FIG. 11 is a block diagram of the preferred embodiment of the system and method of the present invention.

FIG. 11 is a block diagram illustrating schematically 10 the overall functional characteristics of the present invention. Network 14 identifies the overlay by creating a decoded signal in line 300. Network 14 is actuated by an overlay to determine which table, switch function and/or process is valid. This network creates a coded signal enabling the switches on panel 12 to allow the user to observe only those possibilities for customizing the state table 200. The required table or tables is then selected, as indicated by block 302. A selected specific table is transferred to a random access location 304 from pad controlled device 301 to select one table. The various switches on display 12 and various manual inputs are then activated by interface 10 for updating and customizing the particular state table stored at location 304 as indicated by dashed lines to device 304. Indexing from area-to-area along the work points is done manually by device 62. Thereafter, this customized state table or program is loaded into controller 40 where it is adaptively modulated by current, voltage and other parameters through converters 180, 182 to produce an instantaneous control signal in output 310 which is indicative of the exact current to be outputted from power supply 30 shown in FIG. 1. The control signal in line 310 controls welding current $I_w$ controller 312.

Figure 12:
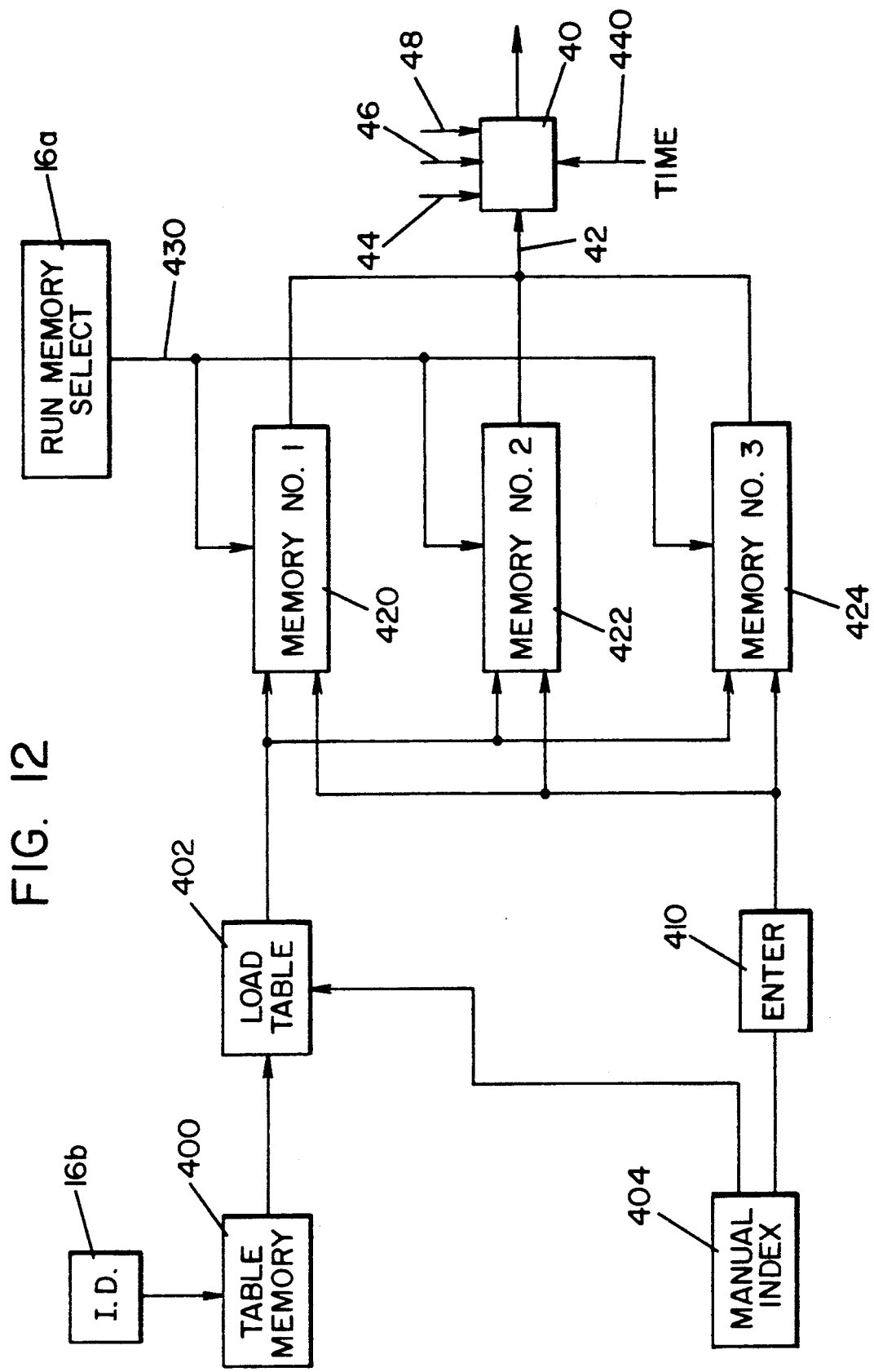
FIG. 12 is a logic diagram of the preferred embodiment of the present invention; and, FIG. 13 is a flow chart of the "memory run" operation of the present invention.

The general overall preferred operation of the system and method of the present invention is schematically illustrated in FIG. 12 wherein overlay 16b identifies the particular generic state table or program to be implemented for a particular welding process. The tables are stored digitally in a memory device 400 which may be permanent memory capacity within interface 10 or a memory card, or a floppy disk storage loaded into interface 10. The particular table is then loaded into a scratch pad type memory location 402 for customizing. The generic state table is constructed to control a particular welding cycle or pulse profile with a known group of parameters. With the overlay 16b in place, the manual indexing subroutine 404 activates the switches and lights on the face of panel 12 for customizing the state table temporarily stored in memory 402. A welding engineer, or person skilled in the art of selecting welding parameters, customizes the state table so that it will perform the desired welding parameters from position to position during the welding operation. After the state table has been appropriately customized so that it contains the desired series of program states, the customized state table is entered by device 410 into one of the designated memory devices 420, 422 and 424. Only three devices are shown; however, in the preferred embodiment six separate memory locations or addresses are employed in practicing the invention. Of course, any number of memory locations could be provided for customized state tables without departing from the intended concept of the novel method and system. Thereafter, overlay 16b is removed from panel 12 and replaced with a "run memory" select overlay 16a, as shown in FIG. 5. This overlay is identified as a "run memory" overlay for a given group of programs by network 14, so that an operator merely activates a selected switch on the face of the panel 12 for outputting the desired customized state table from the selected group into weld controller 40 for control of power supply 30, as previously described and in accordance with somewhat standard practice. Line 430 illustrates this process step. Feedback signals in lines 44, 46 and/or 48 are used to adaptively modify the state table being implemented at any given time. An appropriate timing signal in line 440 indexes the state table from state to state so that at any given time, all parameters are controlled by the selected state table, as modified by the various feedback signals. The various areas of table 200 are illustrated schematically in FIG. 9. A manual control can be employed for shifting the state table into various operating areas for implementation or the feedback signals can be used to modify the operating set of states in a state table. The term state tables means any digitally defined program which can be stored and customized by the switches on panel 12. The invention can be performed by many digital programmed concepts and the state table description is indicative of this fact and is revealed to show the practical implementation of the present invention.

FIG. 13 illustrates a flow chart for processing selected, customized programs or state tables in memory devices 420, 422, 424, etc. as discussed with regard to FIG. 12. An operator selects one of the customized programs or state tables as indicated by process step 450. This closes one of the switches 452, 454, 456, etc. to load the active table into controller 40 as indicated by process step 460. A local indexing of the table can be accomplished by process step 470. This allows the active table to control the pulse profile at generator 480 which outputs a control signal at 490.

Having thus defined the invention, the following is claimed:

1. A system for controlling a welding cycle of an arc welder, said system comprising: a number of digital programs stored in a digital memory device, with each of said programs including a plurality of digitally coded welding parameters indicative of selected functions of a specific welding cycle; a weld controller including means for converting the selected functions of a digital program into welding parameters at the output of said welder; a display panel having a group of switches located in a given pattern and a decoder network means at a selected position for creating a decoded signal indicative of the activation pattern of said decoder network; means responsive to said decoded signal for activating said switches in either a first condition where said switches activate means for modifying a selected one of said digital programs or a second condition where said switches activate means for creating a program select signal corresponding to a given digital program; means responsive to a program select signal for selecting one of said programs corresponding to said program select signal; and loading means for loading said selected one of said programs into said weld controller for controlling said welding parameters of said welder in accordance with said selected one of said programs.

2. A system as defined in claim 1 wherein said welding parameters include welding current.

3. A system as defined in claim 2 wherein said digital programs each have several indexed operating areas and including means responsive to one or more of said switches for changing the indexed operating area of a selected one of said programs when said switches are in said first condition.

4. A system as defined in claim 2 including means responsive to one or more of said switches for changing a welding parameter of a selected one of said programs when said switches are in said first condition.

5. A system as defined in claim 2 including means for loading a selected one of said programs into a first intermediate memory device, means for loading a selected one of said programs in a second intermediate memory device and said loading means including means for selectively loading the program of one of said intermediate memory devices into said weld controller.

6. A system as defined in claim 5 wherein selective loading means includes a means responsive to operation of one of said switches on said display panel for activating a selected one of said intermediate memory devices.

7. A system as defined in claim 5 including means for activating said network means to render said selective loading means operative.

8. A system as defined in claim 1 wherein said welding parameters include the profile of a current pulse.

9. A system as defined in claim 8 wherein said programs each have several indexed operating areas and including means responsive to one or more of said switches for changing the indexed operating area of a selected one of said programs when said switches are in said first condition.

10. A system as defined in claim 1 wherein said programs each have several indexed operating areas and including means responsive to one or more of said switches for changing the indexed operating area of a selected one of said programs when said switches are in said first condition.

11. A system as defined in claim 10 including means responsive to one or more of said switches for changing a welding parameter of a selected one of said programs when said switches are in said first condition.

12. A system as defined in claim 11 including means for loading a selected one of said programs into a first intermediate memory device, means for loading a selected one of said programs in a second intermediate memory device and said loading means including means for selectively loading the program of one of said intermediate memory devices into said weld controller.

13. A system as defined in claim 12 wherein selective loading means includes a means responsive to operation of one of said switches on said display panel for activating a selected one of said intermediate memory devices.

14. A system as defined in claim 12 including means for activating said network means to render said selective loading means operative.

15. A system as defined in claim 1 including means responsive to one or more of said switches for changing a welding parameter of a selected one of said programs when said switches are in said first condition.

16. A system as defined in claim 15 wherein said display panel has a read-out meter and including a specific overlay adapted to be mounted over said display panel and having indicia aligned with one or more of said switches, an opening aligned with said read-out meter and a distinct decoding pattern means over said network for identifying said specific overlay.

17. A system as defined in claim 16 wherein said overlay is a cycle modifying overlay and includes a given pattern of indicia aligned with said network for allowing said switches to shift to said first condition for changing said parameters.

18. A system as defined in claim 1 including means for loading a selected one of said programs into a first intermediate memory device, means for loading a selected one of said programs in a second intermediate memory device and said loading means including means for selectively loading the program of one of said intermediate memory devices into said weld controller.

19. A system as defined in claim 18 wherein selective loading means includes a means responsive to operation of one of said switches on said display panel for activating a selected one of said intermediate memory devices.

20. A system as defined in claim 19 including means for activating said network means to render said selective loading means operative.

21. A system as defined in claim 18 including means for activating said network means to render said selective loading means operative.

22. A system as defined in claim 1 including a specific overlay means adapted to be mounted over said display panel for creating a selected decoded signal to shift said switches into said first condition, said overlay means having indicia aligned with one or more of said switches and a distinct decoding pattern means aligned with said network for identifying said specific overlay and creating said selected decoded signal.

23. A system as defined in claim 22 wherein said overlay means is a given cycle selecting overlay and includes a specific decoding pattern to activate said network with a decoded signal for selecting said selected one of said digital programs to be modified by said switches and corresponding to said given cycle.

24. A system as defined in claim 23 wherein said given cycle is a pulsing welding current.

25. A system as defined in claim 23 wherein said given cycle is a generally steady state welding process.

26. A system as defined in claim 22 wherein said overlay means is a memory select overlay and includes a given pattern of indicia aligned with said network for shifting said switches to said second condition and allowing operation of said selective loading means to select one of said intermediate memory devices in response to said switches.

27. A system as defined in claim 1 wherein said decoded signal from said network selects a particular digital program and shifts said switches into said first condition for customizing of said selected one of said digital programs.

28. A system for controlling an electric arc welder comprising: means for providing a number of digitally stored operation programs for controlling the parameters of a weld cycle; a weld controller means for operating said arc welder in accordance with a selected one of said programs loaded into said controller; a display panel having switches arranged in a preselected pattern with first means for causing one or more of said switches to select one of said programs and second means for causing said switches to change said parameter in a selected one of said programs; said first and second means being activated at different times; and an overlay adapted to be mounted on said panel with indicia aligned with said switches, said overlay including decode means for activating either said first or second means and decode means for identifying said program to be selected or changed.

29. A system as defined in claim 28 including means for loading said selected one of said programs into said weld controller when said first means is activated.

30. A system as defined in claim 29 wherein said overlay includes means for selecting said first means.

31. A system as defined in claim 28 including means for changing said parameters in said selected program by said switches when said second means is activated.

32. A system as defined in claim 31 wherein said overlay includes means for selecting said second means.

33. A method for controlling a welding cycle of an arc welder, said method comprising:
(a) providing a number of digital programs stored in a digital memory device, with each of said programs including a plurality of digitally coded welding parameters indicative of selected function of a specific welding cycle,
(b) a weld controller including means for converting the selected functions of a digital program into welding parameters at the output of said welder;
(c) providing a display panel having a group of switches located in a given pattern with means for causing at least one of said switches to change said parameter in one of said programs and a decoder network means at a selected position for creating a decoded signal indicative of the activation pattern of said decoder network;
(d) selecting one of said programs corresponding to said decoded signal; and,
(e) loading said selected one of said programs into said weld controller for controlling said welding parameters of said welder in accordance with selected one of said programs.

34. A method as defined in claim 33 wherein said programs each have several indexed operating areas and including the further step of changing the indexed operating area of said selected one of said programs in response to one or more of said switches before it is loaded into said weld controller.

35. A method as defined in claim, 33 including the further step of changing a welding parameter of said selected one of said programs in response to one or more of said switches before it is loaded into said weld table.

36. A system as defined in claim 33 including the further steps of:
   (f) loading a selected one of said programs into a first intermediate memory device;
   (g) loading a selected one of said programs in a second intermediate memory device; and,
   (h) selectively loading the program of one of said intermediate memory devices into said weld controller.

37. A method as defined in claim 36 further including the step of activating a selected one of said intermediate memory devices in response to operation of one of said switches.

38. A method as defined in claim 36 including the further step of activating said network means to render said selective loading means operative.

39. A method as defined in claim 33 including the further step of activating said network means to render said selective loading means operative.

40. A method as defined in claim 33 including the further step of changing the indexed operating area of said selected one of said programs in response to a sensed welding parameter at the output of said welder.

41. A method as defined in claim 33 including the further step of changing a welding parameter of said selected one of said programs in response to a sensed welding parameter at the output of said welder.

42. A system for controlling an electric arc welder comprising: means for providing a number of digitally stored operation programs for controlling the parameters of a weld cycle; a weld controller means for operating said arc welder in accordance with a selected one of said programs loaded into said controller; a display panel having switches arranged in a preselected pattern with first means for causing one or more of said switches to operate in a first condition and second means for causing said switches to operate in a second condition; said first and second means being activated at different times; and an overlay adapted to be mounted on said panel with indicia aligned with said switches, said overlay including decode means for activating either said first or second means.

43. A system for controlling an electric arc welder comprising: means for providing a number of digitally stored operation programs for controlling the parameters of a weld cycle; a weld controller means for operating said arc welder in accordance with a selected one of said programs loaded into said controller; a display panel having switches; a selector means for allowing said switches to customize a selected one of said digital programs; means for storing said customized digital programs in selected memory locations; and, means for allowing said switches to select one of said stored customized digital programs and to load said selected customized digital program into said weld controller, said selector means and means for selecting said program being activated at different times.

44. A method of controlling an electric arc welder, said method comprising the steps of:
   (a) providing a number of digitally stored operation programs for controlling the parameters of a weld cycle;
   (b) operating said arc welder in accordance with a selected one of said programs loading into said controller;
   (c) providing a display panel having switches;
   (d) allowing said switches to customize a selected one of said digital programs;
   (e) storing said customized digital programs in selected memory locations; and,
   (f) loading a selected one of said customized digital programs into said weld controller, said loading of said program and customizing said program occurring at different times.

* * * * *